Aug. 21, 1923. Re. 15,677
C. R. BROWN ET AL
CHURN
Original Filed Sept. 12, 1918 2 Sheets-Sheet 1
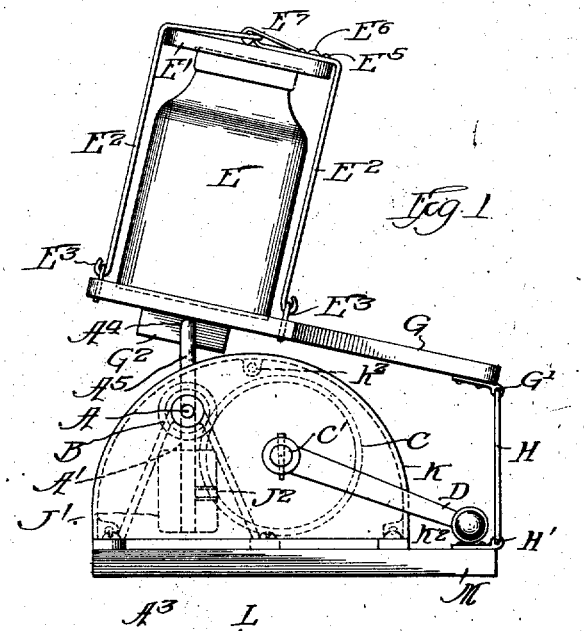
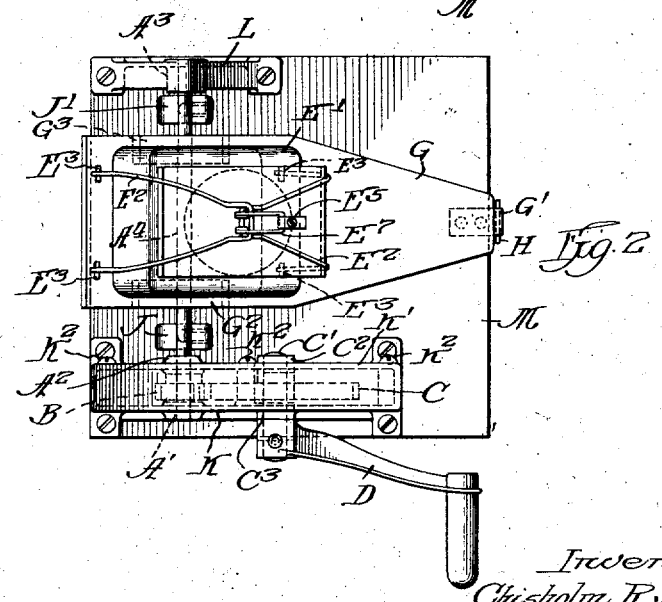
Inventors:
Chisholm R. Brown
Herbert H. Hinds,
By Wilson & McCanna Attys.
Witness:
R. C. Dawson Aug. 21, 1923. Re. 15,677
C. R. BROWN ET AL
CHURN
Original Filed Sept. 12, 1918 2 Sheets-Sheet 2
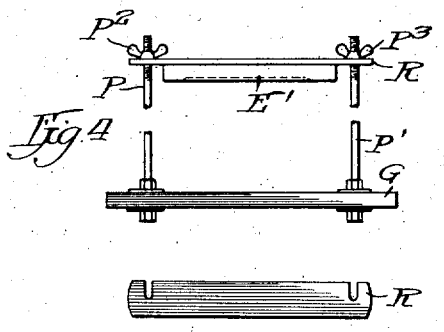
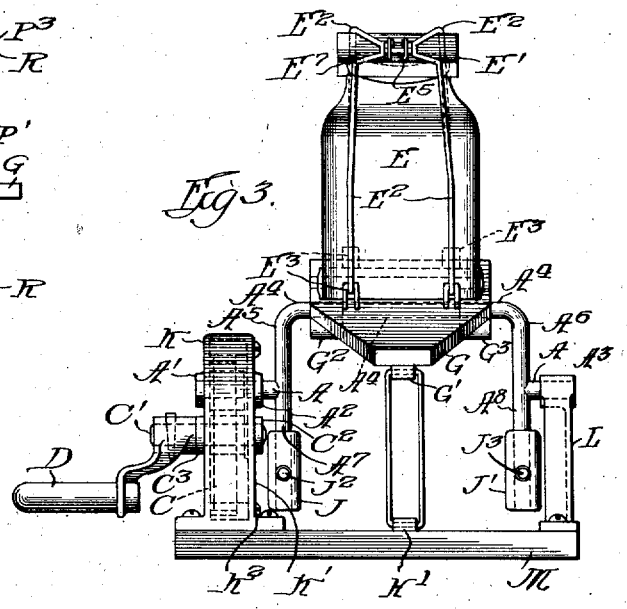
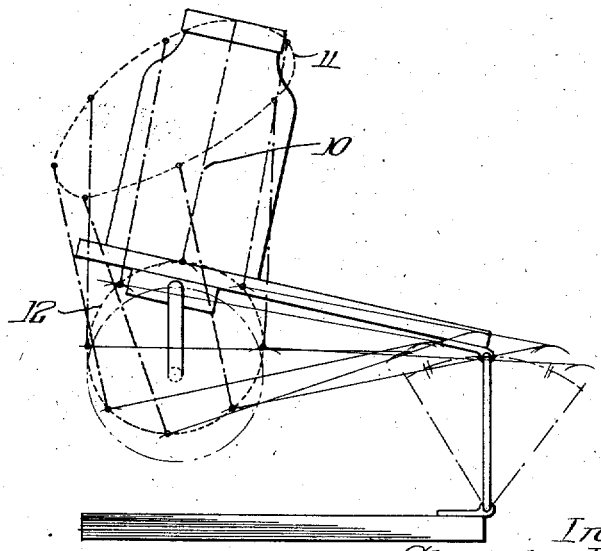
Witness:
Geo. E. Larson
Inventors
Chisholm R. Brown
Herbert H. Hinds.
By Wilson & McCanna
Attys Reissued Aug. 21, 1923. Re. 15,677

UNITED STATES PATENT OFFICE.

CHISHOLM ROY BROWN, OF SOMERTON, AND HERBERT HENRY HINDS, OF SYDNEY, NEW SOUTH WALES, AUSTRALIA, ASSIGNORS TO EMERSON-BRANTINGHAM COMPANY, OF ROCKFORD, ILLINOIS, A CORPORATION OF ILLINOIS.

CHURN.

Original No. 1,365,963, dated January 18. 1921, Serial No. 253,815, filed September 12, 1918. Application for reissue filed April 19, 1923. Serial No. 633,249.

*To all whom it may concern:*

Be it known that we, CHISHOLM ROY BROWN and HERBERT HENRY HINDS, subjects of the King of Great Britain, residing at Mendeberie, Somerton, in the State of New South Wales, Australia, and 484 Kent Street, Sydney, in the State of New South Wales, Australia, respectively, have invented certain new and useful Improvements in Churns, of which the following is a specification.

Briefly stated the present invention consists essentially of means for imparting to the receptacle containing the cream a continuous revolving movement around a crank center.

The invention further contemplates the provision of means for imparting a tilting movement to the cream receptacle simultaneously with the revolving motion mentioned.

In the preferred form of churn according to this invention, the two motions mentioned are combined to secure the highest degree of turbulence or surging to the cream when the churn is in operation.

A practical form of churn incorporating these improvements is illustrated in the appended drawings in which—

Fig. 1 is a side elevation of a churn;

Fig. 2 is a plan of the same;

Fig. 3 is an end elevation;

Figs. 4 and 5 show another arrangement of clip for securing a closure cap on to the cream receptacle; and Fig. 6 is a diagrammatic view showing the paths of travel of the upper and lower ends of the longitudinal axis of the receptacle.

Referring particularly to Figs. 1 to 3 inclusive, the jar E containing the cream to be treated which in practice would occupy about two-thirds of the interior space of the jar, is provided with a closure cap E′ which is held in closed position by suitable clips. The clips $E^2$ $E^2$ illustrated will be found suitable and are formed of a pair of U-shaped loops of wire, the ends of the legs of the clips being pivotally secured to the table G by staples $E^3$ $E^3$ and when in bearing position over the cap E′ also act to secure the jar E upon the table G.

The table G is supported upon the crank shaft A by means of the pair of bearing blocks $G^2$ and $G^3$ secured to the underside of the table and through which blocks the crank pin $A^4$ freely passes. The crank pin $A^4$ is of sufficient length to allow the table G to clear the two crank arms $A^5$ and $A^6$. The said arms are provided with extensions $A^7$ and $A^8$, each carrying a balance weight J and J′ secured thereby by screws $J^2$ and $J^3$. The toothed pinion B secured upon the shaft A gears with the toothed wheel C fixed on spindle C′ mounted in bearings $C^2$ and $C_3$ which spindle has a terminal operating handle D.

The table G is extended as shown and the top end of the vibratory or radial rod or link H pivotally supports said extended end. This rod H is pivotally connected at its lower end (at H′) to the base plate M.

The pinion B and intermeshing wheel C are housed within the casing K, bearings for same being conveniently formed in the casing sides. For ready access to pinion B and wheel C one side K′ of the casing is removable by removing the screws $K^2$. The outer end of the shaft A is supported in a bearing bracket L which together with the casing K is screwed to the base plate M.

In use, with the jar E charged with cream, manual rotation of the handle D causes rotation of the crank shaft through gear wheels B and C and the table G being connected to the pivoted rod H effects a combined rotary and simultaneous tilting or oscillating motion to the jar E carried by the table G.

It will be apparent from Fig. 6, wherein the longitudinal axis of the cream receptacle is shown by a dotted line and indicated by reference character 10, that, as the result of the combined action of the crank and oscillatable link and the upright position of the receptacle, the upper end of the receptacle is caused to travel in a substantially elliptical path or orbit indicated by 11, while the lower end travels in a path or orbit 12 substantially but not necessarily circular but in any event of less axial dimensions than the major axis of the upper orbit. The tilting or oscillating movement of the upper end of the receptacle relatively to the lower in conjunction with the bodily rotary movement of the receptacle imparts a peculiar and desirable agitation to the cream in the receptacle which results in the production of butter in a minimum of time.

When operating the machine at about one hundred and fifty revolutions per minute of the crank shaft the contents of the partially filled jar will oscillate and shift its position relatively to that of the crank pin—that is during intervals of each revolution of the crank the jar contents will tend to move upward, sidewise and downward and to rock to and fro, which particular combination of motions will constantly agitate and mix up the contents and so produce the butter in a remarkably short time.

The manipulation of the clips hereinbefore mentioned for securing the cap upon the cream vessel is as follows: The vessel E having been placed in position on the table G the wire clip $E^2$, $E^2$ is brought over for its upper end to rest upon the cap E′, at the same time allowing the link $E^7$ to lie over to the left, then the clip $E^2$ $E^2$ is brought over to permit of its upper end to rest upon E′, E′, when both are pressed hard down onto the cap and the link $E^7$ turned over to the right and its end placed under the hold-fast $E^5$; which hold-fast $E^5$ is capable of being turned upon its screw $E^6$ by which it is kept in position upon the cap E′. For the release of the cap the reverse of the afore described operations will be carried out.

Figs. 4 and 5 illustrate a modification of the clip above described for securing the cap onto the cream vessel in which two vertical screw bolts P and P′ are secured into the table G and are fitted at their threaded upper ends with winged nuts $P^2$ and $P^3$ for tightening the clamping plate R with its attached cap E′ onto the cream vessel.

We claim:

1. In a churn, in combination, a frame, a crank mounted in the frame and arranged for continuous rotation about its axis, a table mounted thereon, a cream receptacle mounted in upright position on said table in proximity to said crank, and means connecting the table to the frame at a point horizontally distant from the crank whereby a tilting motion is imparted to the table simultaneously with the revolving motion to thereby move the upper end of the receptacle a greater distance than the lower end thereof.

2. In a churn, the combination of a frame, a rotatable crank mounted in said frame, a table connected near one end to said crank, an oscillating link pivoted at its lower end to said frame and at its upper end to the other end of said table, and a cream receptacle mounted in upright position on said table in proximity to said crank so that the upper end of said receptacle travels a greater distance than the lower end thereof upon rotation of the crank.

3. In a churn, the combination, of a frame, a rotatable crank mounted therein, an oscillatory link pivoted to the frame, a table carried at its opposite ends by said crank and said link respectively, and a cream receptacle mounted on said table in upright position so that a horizontal movement in excess of the throw of said crank is imparted to the upper end of said receptacle by the rotary and oscillatory movements of said table.

4. In a churn, the combination of a platform, a cream receptacle mounted thereon in upright position, and means including a rotatable crank and an oscillatable link for imparting, through said platform to said receptacle, a rotary movement and simultaneously therewith an oscillatory movement, causing the upper end of the receptacle to travel through a path of greater horizontal dimensions than the throw of said crank.

5. In a churn, the combination of an upright cream receptacle, a support therefor, and means including an oscillating link and a crank for actuating said support whereby the upper end of the longitudinal axis of said receptacle is moved in a substantially elliptical orbit, the major axis of which is greater than the throw of said crank.

6. In a churn, the combination of a support, a cream receptacle mounted thereon, and means for moving said receptacle so that one end of the longitudinal axis thereof travels in a substantially circular path, while the other end travels in a substantially elliptical path having a greater dimension than the first mentioned path.

7. A churn comprising a frame, a table, a receptacle mounted thereon, means for imparting a circular movement to the bottom of said receptacle and an elliptical movement to the top of said receptacle, the major axis of travel of said top being greater than the diameter of the path of travel of said bottom.

CHISHOLM ROY BROWN.
HERBERT HENRY HINDS.